(12) United States Patent  
Yamamoto et al.

(10) Patent No.: US 9,154,207 B2  
(45) Date of Patent: Oct. 6, 2015

(54) COMMUNICATION APPARATUS AND COMMUNICATION METHOD

(71) Applicant: Panasonic Corporation, Osaka (JP)

(72) Inventors: Naotake Yamamoto, Osaka (JP); Yosuke Ukita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/375,303

(22) PCT Filed: Sep. 18, 2013

(86) PCT No.: PCT/JP2013/005519  
§ 371 (c)(1),  
(2) Date: Jul. 29, 2014

(87) PCT Pub. No.: WO2014/050031  
PCT Pub. Date: Apr. 3, 2014

(65) Prior Publication Data  
US 2015/0016564 A1    Jan. 15, 2015

(30) Foreign Application Priority Data

Sep. 28, 2012  (JP) .................................. 2012-218176

(51) Int. Cl.  
*H04B 7/06* (2006.01)  
*H04W 4/06* (2009.01)

(52) U.S. Cl.  
CPC ............... *H04B 7/0602* (2013.01); *H04W 4/06* (2013.01)

(58) Field of Classification Search  
CPC ... H04W 76/023; H04W 84/10; H04W 16/28; H04W 28/14; H04W 40/00; H04W 40/02; H04W 48/18; H04W 4/18; H04W 52/0261; H04W 52/04; H04W 52/38; H04W 52/46; H04W 72/12; H04W 76/02; H04W 76/041; H04W 4/06; H04B 7/0602; H04L 1/0002; H04L 1/0003; H04L 1/0025; H04L 1/0032; H04L 1/1671; H04L 1/1685; H04L 27/12; H04L 27/14; H04L 27/156; H04L 29/06; H04L 29/12009; H04L 45/00; H04L 45/04  
See application file for complete search history.

(56) References Cited

U.S. PATENT DOCUMENTS 6,763,237 B1 * 7/2004 Katz .............................. 455/450  
7,860,184 B2 * 12/2010 She et al. ...................... 375/267  
(Continued)

FOREIGN PATENT DOCUMENTS

| JP | 10-135886 | 5/1998 |
|---|---|---|
| JP | 3019147 | 3/2000 |

(Continued)

OTHER PUBLICATIONS

International Search Report issued Oct. 22, 2013 in International Application No. PCT/JP2013/005519.

*Primary Examiner* — Hirdepal Singh  
(74) *Attorney, Agent, or Firm* — Wenderoth, Lind & Ponack, L.L.P.

(57) ABSTRACT

A communication apparatus which communicates data with plural other communication apparatuses by performing wireless communication includes: plural antennas; a communication level obtainment unit which obtains communication levels for the antennas obtained when the communication apparatus performed the wireless communication with the other communication apparatuses; a count unit which counts, for each of the antennas, the number of established communications that is the number of one or more of the other communication apparatuses which successfully established communication through the antenna; an antenna selection unit which selects, when the total number of antennas whose numbers of established communications are greatest is more than one, one of the antennas corresponding to a communication level that is highest among communication levels of plural antennas of the other communication apparatus corresponding to the lowest communication level; and a transmission unit which broadcasts predetermined data to the other communication apparatuses through the selected antenna.

13 Claims, 12 Drawing Sheets

(56) References Cited

U.S. PATENT DOCUMENTS

| | | |
|---|---|---|
| 8,165,048 B2 | 4/2012 | Imaeda |
| 8,774,736 B2 * | 7/2014 | Choi et al. .................. 455/101 |
| 8,837,555 B2 * | 9/2014 | Sinsuan et al. ............... 375/146 |
| 9,031,048 B2 * | 5/2015 | Bhukania ..................... 370/338 |
| 2004/0103278 A1 * | 5/2004 | Abhishek et al. ............ 713/160 |
| 2009/0252140 A1 | 10/2009 | Imaeda |
| 2012/0243513 A1 * | 9/2012 | Fujishima et al. ............ 370/336 |
| 2013/0156080 A1 * | 6/2013 | Cheng et al. ................. 375/222 |
| 2013/0163531 A1 * | 6/2013 | Kim .............................. 370/329 |
| 2014/0022919 A1 * | 1/2014 | Dwivedi et al. ............... 370/252 |
| 2014/0269338 A1 * | 9/2014 | Jung et al. ..................... 370/241 |
| 2015/0023400 A1 * | 1/2015 | Das et al. ...................... 375/224 |

FOREIGN PATENT DOCUMENTS

| | | |
|---|---|---|
| JP | 2000-209145 | 7/2000 |
| JP | 2007-306087 | 11/2007 |
| JP | 2009-253703 | 10/2009 |

* cited by examiner

| Authenticated terminal | Reception level for antennas of access point | |
|---|---|---|
| | First antenna (ANT1) | Second antenna (ANT2) |
| Station A | -93 dBm | - |
| Station B | -80 dBm | -70 dBm |
| Station C | -85 dBm | -80 dBm |
| Station D | -75 dBm | -60 dBm |

(b)

| Authenticated terminal | Reception level for antennas of access point | |
|---|---|---|
| | First antenna (ANT1) | Second antenna (ANT2) |
| Station A | -93 dBm | -80 dBm |
| Station B | -80 dBm | -70 dBm |
| Station C | -85 dBm | -80 dBm |
| Station D | -75 dBm | -60 dBm |

| Authenticated terminal | Reception level for antennas of access point | |
|---|---|---|
| | First antenna (ANT1) | Second antenna (ANT2) |
| Station A | -93 dBm | -80 dBm |
| Station B | -92.5 dBm | -70 dBm |
| Station C | -90 dBm | -80 dBm |
| Station D | -92 dBm | -60 dBm |

(b)

| Authenticated terminal | Reception level for antennas of access point | Determination on communication |
|---|---|---|
| | First antenna (ANT1) | |
| Station A | -98 dBm | Unable |
| Station B | -97.5 dBm | Unable |
| Station C | -95 dBm | Unable |
| Station D | -97 dBm | Unable |

(c)

| Authenticated terminal | Reception level for antennas of access point | Determination on communication |
|---|---|---|
| | Second antenna (ANT2) | |
| Station A | -85 dBm | Able |
| Station B | -75 dBm | Able |
| Station C | -85 dBm | Able |
| Station D | -65 dBm | Able |

COMMUNICATION APPARATUS AND COMMUNICATION METHOD

TECHNICAL FIELD

The present invention relates to a method of selecting an antenna for use in data transmission in transmission diversity technique for wireless communication.

BACKGROUND ART

In recent years, besides conventional wire communication, attention has been focused on wireless communication that is more convenient. In wireless communication, a technique (diversity technique) is available in which plural antennas are provided and used in communication for the purpose of expanding a communication area or suppressing an effect of an interference wave.

In such a network including (i) an access point having plural antennas and (ii) plural stations, when broadcasting data to the stations, the access point is required to select, among the antennas, an antenna for use in broadcasting data to the stations. The conventional method for selecting an antenna for broadcasting includes a method of detecting, for each of the antennas of the access point, the number of errors in data (signals) received by the access point through the antenna, and selecting the antenna having less errors from among the antennas (see Patent Literature (PTL) 1).

CITATION LIST

Patent Literature

[PTL 1] Japanese Patent No. 3019147

SUMMARY OF INVENTION

Technical Problem

However, with the method disclosed in PTL 1, the optimal antenna may not be selected for stations having low communication levels, which may cause these stations to be unable to communicate.

The present invention solves the above issue in the conventional technique, and has an object to establish more robust and secure communication between an access point and stations for broadcasting from the access point to the stations.

Solution to Problem

In order to solve the above issue in the conventional technique, a communication apparatus according to the present invention is a communication apparatus which communicates data with a plurality of other communication apparatuses by performing wireless communication, the communication apparatus including: a plurality of antennas which transmit and receive a radio wave for the wireless communication; a communication level obtainment unit configured to obtain communication levels obtained when the communication apparatus performed the wireless communication with the other communication apparatuses, the communication levels being obtained for a plurality of pairs each including one of the antennas and one of the other communication apparatuses; a count unit configured to count, for each of the antennas, the number of established communications that is the number of one or more of the other communication apparatuses which successfully established communication through the antenna; a determination unit configured to determine whether or not a total number of antennas whose numbers of established communications counted by the count unit are greatest is more than one; an antenna selection unit configured to, when it is determined by the determination unit that the total number of antennas whose numbers of established communications are greatest is more than one, identify one of the other communication apparatuses corresponding to a lowest communication level among the communication levels of the pairs obtained by the communication level obtainment unit, and select, as an antenna for use in broadcasting, one of the antennas corresponding to communication levels higher than the lowest communication level among communication levels of the identified other communication apparatus through the antennas; and a transmission unit configured to broadcast predetermined data to the other communication apparatuses through the antenna selected by the antenna selection unit.

With this, when the antennas have the same numbers of established communications, one of the other communication apparatuses corresponding to the lowest communication level among the communication levels of all of the pairs obtained by the communication level obtainment unit is identified, and one of the antennas corresponding to higher RSSIs among the communication levels of the pairs corresponding to the identified other communication apparatus is selected. In other words, at least the antenna corresponding to the lowest communication level among the communication levels of the pairs obtained by the communication level obtainment unit is not selected. Furthermore, since the station corresponding to the lowest communication level is focused, the antenna to which the other communication apparatus is more likely to be able to communicate is selected, with reference to the other communication apparatus having the worst communication conditions for the communication apparatus. As described above, since the antenna having better communication conditions is selected for the station having the worst conditions, the antenna which has a better communication conditions can be surely selected even when the number of established communications through one of the antennas and the number of established communications through an other one of the antennas are determined to be equal. In other words, even when RSSI varies temporally due to the fading, the optimal antenna is selected for the station having poor reception, which reduces the stations unable to communicate and realize stable communications. With this, the number of other communication apparatuses capable of performing wireless communication with the communication device can be increased.

It is to be noted that general or specific aspects of the above may be realized by a system, a method, an integrated circuit, a computer program, or a computer-readable recording medium such as a CD-ROM, and an arbitrary combination of a system, a method, an integrated circuit, a computer program, and a recording medium.

Advantageous Effects of Invention

With the communication apparatus according to the present invention, the number of other communication apparatuses capable of performing wireless communication with the communication apparatus can be increased.

BRIEF DESCRIPTION OF DRAWINGS

FIG. 8 illustrates an example of the antenna table, and (a) in FIG. 8 illustrates a case where a first antenna 2 and a second antenna 3 have different numbers of established communications, and (b) in FIG. 8 illustrates a case where the first antenna 2 and the second antenna 3 have the same numbers of established communications.

In FIG. 9, (a) illustrates an example of the antenna table, (b) illustrates a determination on communication when the first antenna 2 is selected and fading of −5 dBm occurs, and (c) illustrates a determination on communication when the second antenna 3 is selected and fading of −5 dBm occurs.

Figure 1:
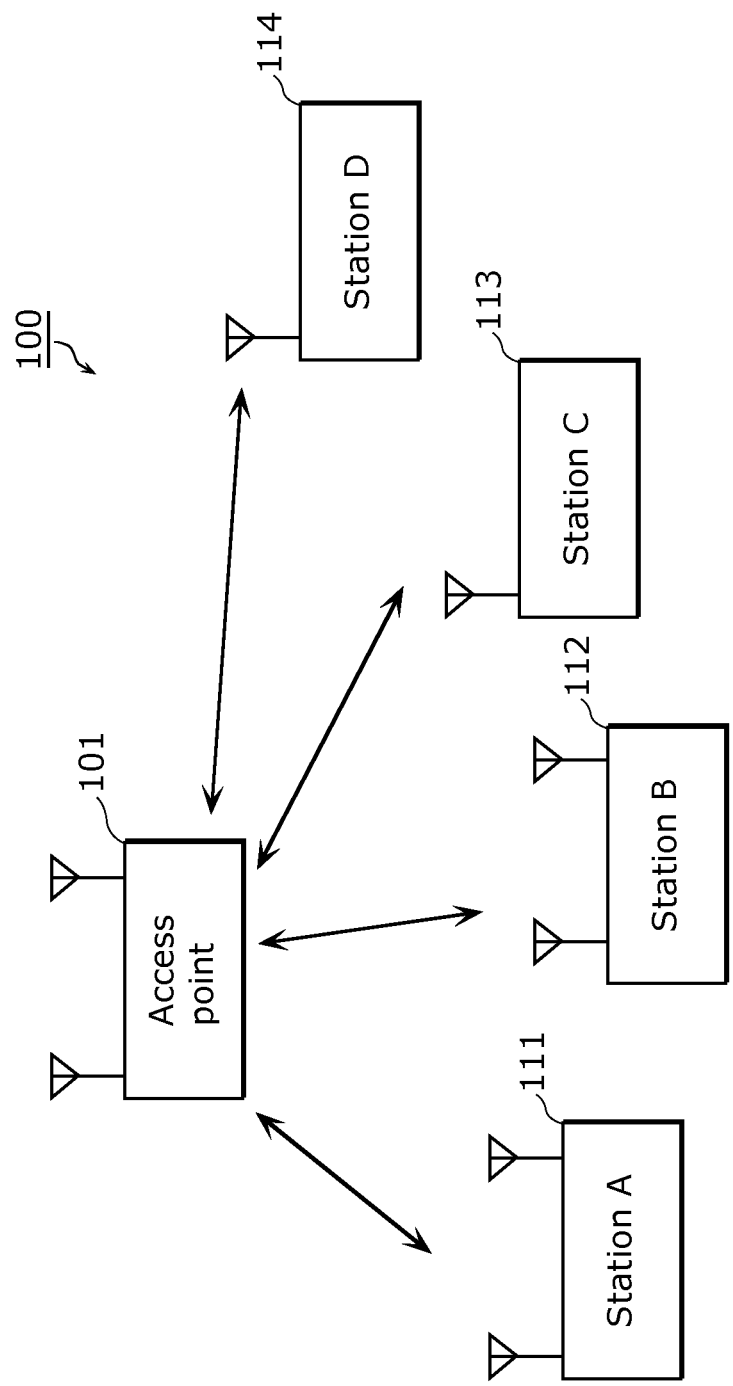
FIG. 1 illustrates an example of a system structure according to Embodiment 1 of the present invention.

DESCRIPTION OF EMBODIMENTS (Underlying Knowledge Forming Basis of the Present Invention)

The inventors have found that the following problems are caused in the communication apparatus described in "Background" section.

PTL 1 discloses a communication apparatus which uses a method of selecting an antenna for use in broadcasting as described above. In the method, the errors in the data received by the access point are detected for each of the antennas and the antenna having less errors in the data is determined and selected.

However, the method disclosed in PTL 1 fails to clearly state the method of selecting an antenna in the case where the same number of errors are detected at the plural antennas. Thus, the optimal antenna may not be selected for a station having the lowest communication level, which may cause the station to be unable to communicate.

In order to solve the above issue in the conventional technique, a communication apparatus according to the present invention is a communication apparatus which communicates data with a plurality of other communication apparatuses by performing wireless communication, the communication apparatus including: a plurality of antennas which transmit and receive a radio wave for the wireless communication; a communication level obtainment unit configured to obtain communication levels obtained when the communication apparatus performed the wireless communication with the other communication apparatuses, the communication levels being obtained for a plurality of pairs each including one of the antennas and one of the other communication apparatuses; a count unit configured to count, for each of the antennas, the number of established communications that is the number of one or more of the other communication apparatuses which successfully established communication through the antenna; a determination unit configured to determine whether or not a total number of antennas whose numbers of established communications counted by the count unit are greatest is more than one; an antenna selection unit configured to, when it is determined by the determination unit that the total number of antennas whose numbers of established communications are greatest is more than one, identify one of the other communication apparatuses corresponding to a lowest communication level among the communication levels of the pairs obtained by the communication level obtainment unit, and select, as an antenna for use in broadcasting, one of the antennas corresponding to communication levels higher than the lowest communication level among communication levels of the identified other communication apparatus through the antennas; and a transmission unit configured to broadcast predetermined data to the other communication apparatuses through the antenna selected by the antenna selection unit.

With this, when the antennas have the same numbers of established communications, one of the other communication apparatuses corresponding to the lowest communication level among the communication levels of all of the pairs obtained by the communication level obtainment unit is identified, and one of the antennas corresponding to higher RSSIs among the communication levels of the pairs corresponding to the identified other communication apparatus is selected. In other words, at least the antenna corresponding to the lowest communication level among the communication levels of the pairs obtained by the communication level obtainment unit is not selected. Furthermore, since the station corresponding to the lowest communication level is focused, the antenna to which the other communication apparatus is more likely to be able to communicate is selected, with reference to the other communication apparatuses having the worst communication conditions for the communication apparatus. As described above, since the antenna having better communication conditions is selected for the station having the worst conditions, the antenna which has a better communication conditions can be surely selected even when the number of established communications through one of the antennas and the number of established communications through an other one of the antennas are determined to be equal. In other words, even when RSSI varies temporally due to the fading, the optimal antenna is selected for the station having poor reception, which reduces the stations unable to communicate and realizes stable communications. With this, the number of other communication apparatuses capable of performing wireless communication with the communication device can be increased.

Furthermore, for example, when it is determined by the determination unit that the total number of antennas whose numbers of established communications are greatest is not more than one, the antenna selection unit may select one of the antennas whose numbers of established communications are greatest.

Furthermore, for example, when it is determined by the determination unit that the total number of antennas whose numbers of established communications are greatest is more than one, the antenna selection unit may identify one of the other communication apparatuses corresponding to the lowest communication level among the communication levels of the pairs obtained by the communication level obtainment unit, and select one of the antennas whose communication levels are highest among communication levels of the identified other communication apparatus through the antennas.

With this, the antenna having the highest communication level is selected. This allows at least the other communication apparatus having the worst communication conditions for the communication apparatus to communicate through the antenna having as good communication conditions as possible.

Furthermore, the communication apparatus may further include a reception unit configured to receive data from the other communication apparatuses using any one of the antennas, wherein the transmission unit may unicast data using any one of the antennas to each of the other communication apparatuses, the reception unit may receive, using any one of the antennas, response information transmitted from, among the other communication apparatuses, an other communication apparatus which received the data unicasted by the transition unit, and the communication level obtainment unit may obtain, as one of the communication levels, a reception level obtained when the response information is received by the reception unit.

Furthermore, while the reception unit is receiving the response information from one of the other communication apparatuses, the antenna selection unit may switch the antenna for use in the reception, and the communication level obtainment unit may obtain, as one of the communication levels, the reception level of each of the antennas used in the reception.

Furthermore, for example, the antenna selection unit may: fix an antenna for use in the reception to any one of the antennas until reception level measurement between the antenna and all of the other communication apparatuses is completed in a time period during which the reception unit is receiving the response information from the other communication apparatuses; and when the reception level measurement between the antenna and all of the other communication apparatuses is completed, switch to another one of the antennas on which reception level measurement with the other communication apparatuses is not completed, and the communication level obtainment unit may obtain, as one of the communication levels, the reception level of each of the antennas used in the reception.

Furthermore, the communication apparatus may further include a storage unit, wherein the communication level obtainment unit may cause the storage unit to store the obtained communication levels as an antenna table in which the obtained communication levels are associated with the antennas and the other communication apparatuses, and the count unit may count, as the number of established communications, the number of one or more of the other communication apparatuses for each of the antennas which have the communication levels stored in the antenna table.

Furthermore, for example, the communication level obtainment unit may further update the antenna table stored in the storage unit every time the reception unit receives the response information, and
the antenna selection unit may select, among the antennas, the antenna for use in broadcasting using the updated antenna table.

Furthermore, for example, the count unit may further count, for each of the antennas, the number of highest level terminals that is the number of one or more of the other communication apparatuses whose communication levels for the antenna are highest, the determination unit may further determine whether or not a total number of antennas whose number of highest level terminals counted by the count unit is greatest is more than one, and when it is determined by the determination unit that the total number of antennas whose numbers of established communications counted by the count unit are greatest is more than one and that the total number of antennas whose numbers of highest level terminals are greatest is more than one, the antenna selection unit may identify one of the other communication apparatuses corresponding to the lowest communication level among the communication levels of the pairs obtained by the communication level obtainment unit, and select, as the antenna for use in the broadcasting, one of the antennas corresponding to the communication levels higher than the lowest communication level among the communication levels of the identified other communication apparatus for each of the antennas.

Furthermore, when it is determined by the determination unit that the total number of antennas whose number of established communications is greatest is not more than one, the antenna selection unit may select one of the antennas whose numbers of highest level terminals are greatest.

It is to be noted that general or specific aspects of the above may be realized by a system, a method, an integrated circuit, a computer program, or a computer-readable recording medium such as a CD-ROM, and an arbitrary combination of a system, a method, an integrated circuit, a computer program, and a recording medium.

Embodiments of the present invention are described below with reference to Drawings.

It is to be noted that each of the embodiments described below is a specific example of the present invention. The numerical values, shapes, constituent elements, the arrangement and connection of the constituent elements, steps, the processing order of the steps etc. shown in the following embodiments are mere examples, and thus do not limit the present invention. Furthermore, out of the constituents in the following embodiments, the constituents not stated in the independent claims describing the broadest concept of the present invention are described as optional constituents.

Embodiment 1

In Embodiment 1, description is provided on a communication apparatus which includes two communication antennas and selects, in broadcast transmission to plural stations via wireless communication, an antenna appropriate for use in the broadcast transmission. The stations represent the other communication apparatuses. An example of the wireless communication standards includes IEEE 802.15.4. Furthermore, the present invention can be applied to other wireless communication standards.

FIG. 1 illustrates an example of a system structure according to Embodiment 1.

The system in FIG. 1 includes an access point 101, a station A111, a station B112, a station C113, and a station D114. The access point 101 communicates data by performing wireless communication with the station A111, the station B112, the station C113, and the station D114. The stations A111 to D114 may each have only one antenna or plural antennas. The access point 101 is an example of a communication apparatus according to an aspect of the present invention. Furthermore, the stations A111 to D114 are examples of other communication apparatuses.

Figure 2:
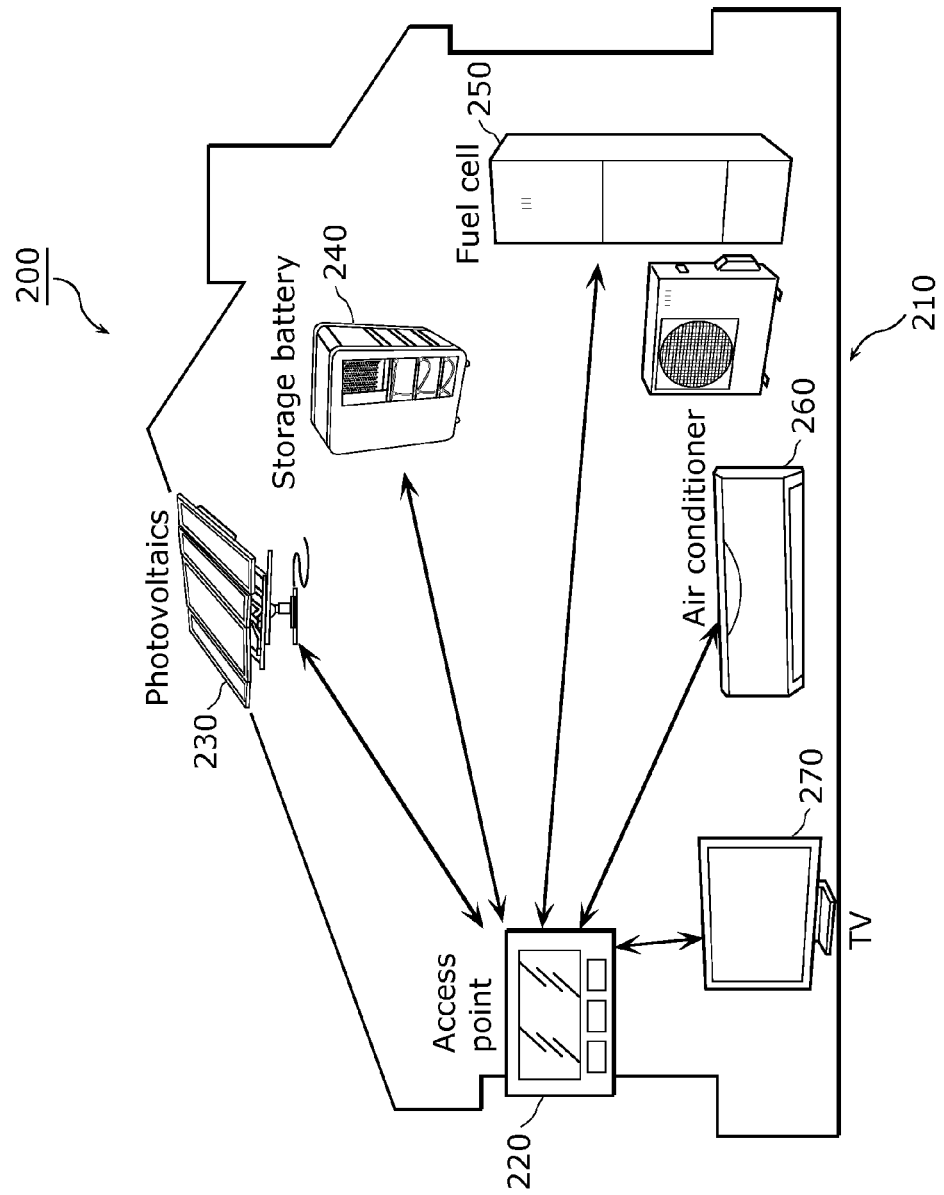
FIG. 2 illustrates a specific application example of the system structure according to Embodiment 1 of the present invention.

FIG. 2 illustrates a specific application example of the system structure according to Embodiment 1.

A system 200 in FIG. 2 is a domestic network 210 established in ordinary homes, and includes an access point 220, photovoltaics 230, a storage battery 240, a fuel cell 250, an air conditioner 260, and a television 270. Respective household electric appliances including the photovoltaics 230, the storage battery 240, the fuel cell 250, the air conditioner 260, and the television 270, are examples of the stations (other communication apparatuses) having wireless communication function.

Figure 3:
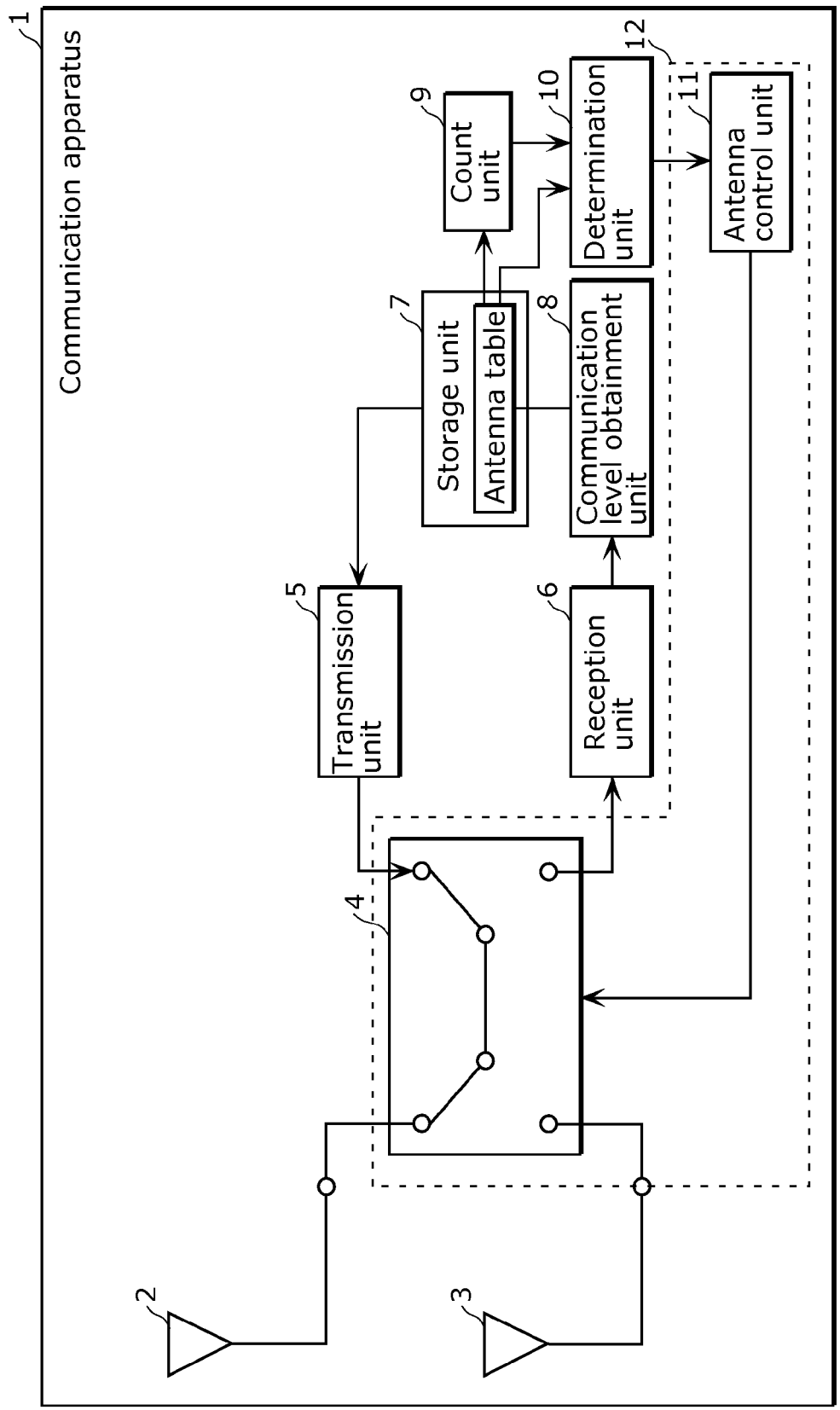
FIG. 3 illustrates an example of a functional block structure of a communication apparatus according to Embodiment 1 of the present invention.

FIG. 3 illustrates an example of a functional block structure of the communication apparatus according to Embodiment 1.

As shown in FIG. 3, the communication apparatus 1 according to Embodiment 1 includes plural antennas 2 and 3, a switch unit 4, a transmission unit 5, a reception unit 6, a storage unit 7, a communication level obtainment unit 8, a count unit 9, a determination unit 10, and an antenna control unit 11.

The antenna 2 is a first antenna 2 and the antenna 3 is a second antenna 3. Each of the antennas 2 and 3 transmits and receives a radio wave for use in the wireless communication.

The switch unit 4 selects one of the first antenna 2 and the second antenna 3 and selects one of the transmission unit 5 and the reception unit 6, according to the control signal from the antenna control unit 11 which is described later. In other words, the switch unit 4 is a switch that switches between the first antenna 2 and the second antenna 3 in one of transmission performed by the transmission unit 5 and reception performed by the reception unit 6, according to the control signal from the antenna control unit 11. Although the transmission by the transmission unit 5 and the reception by the reception unit 6 cannot be performed simultaneously in Embodiment 1, the switch unit 4 may switch one of the first antenna 2 and the second antenna 3 to an antenna for transmission and switch the other one of them to an antenna for reception, thereby allowing transmission by the transmission unit 5 and reception by the reception unit 6 to be performed simultaneously.

The transmission unit 5 broadcasts predetermined data to all of the stations through one of the first antenna 2 and the second antenna 3 selected by the switch unit 4 according to the control signal from the antenna control unit 11. The stations include the photovoltaics 230, the storage battery 240, the fuel cell 250, the air conditioner 260, and the television 270. Here, examples of the predetermined data broadcasted by the transmission unit 5 include data used for changing the frequency channel for use in the wireless communication and data for instructing a change of the frequency channel. In this case, when it is determined that the frequency channel being used has a bad communication status or when the instruction for changing the frequency channel from the user is received for example, the transmission unit 5 broadcasts, as the predetermined data, the data for instructing a frequency channel change to all of the stations 230 to 270. Specifically, the transmission unit 5 broadcasts the predetermined data to the other communication apparatuses through the antenna selected by the antenna selection unit 12 (described later).

Furthermore, the transmission unit 5 unicasts predetermined data to each of the stations through the antenna selected by the switch unit 4 according to the control signal from the antenna control unit 11. The stations include the photovoltaics 230, the storage battery 240, the fuel cell 250, the air conditioner 260, and the television 270. Examples of the data unicasted by the transmission unit 5 include data for controlling ON/OFF of the power source of each of the stations, and data for requesting transmission of data indicating a power consumption of each of the stations. The stations include the photovoltaics 230, the storage battery 240, the fuel cell 250, the air conditioner 260, and the television 270. Such data is unicasted to each of the stations according to the type of the data, when an instruction from the user is received, when data transmission is required, when a predetermined timing comes, and so on. In other words, the transmission unit 5 unicasts the data to each of the other communication apparatuses through one of the first antenna 2 and the second antenna 3.

The reception unit 6 receives the data from each of the stations 230 to 270 through one of the first antenna 2 and the second antenna 3 selected by the switch unit 4 according to the control signal from the antenna control unit 11. Specifically, the reception unit 6 receives acknowledgement (ACK) through one of the first antenna 2 and the second antenna 3, for example. ACK is response information transmitted from a station when the station receives the data unicasted from the transmission unit 5. In addition to ACK, when the data transmitted from the transmission unit 5 is data requesting power consumption for example, the reception unit 6 receives the data indicating the power consumption transmitted from the station in response to the request. Specifically, the reception unit 6 receives data from the other communication apparatuses through one of the antennas 2 and 3.

The storage unit 7 stores the communication levels obtained by the communication level obtainment unit 8 as an antenna table in which the obtained communication levels are associated with the antennas 2 and 3 and the stations 230 to 270.

Figure 4:
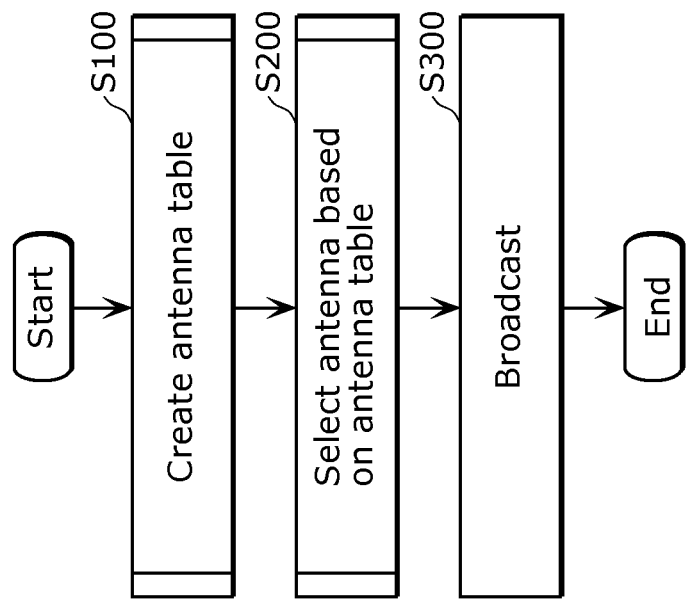
FIG. 4 is a flowchart illustrating a flow of broadcast processing according to Embodiment 1 of the present invention.

The communication level obtainment unit 8 obtains received signal strength indication (RSSI) indicating the reception level obtained when the ACK transmitted from each of the stations 230 to 270 is received by the reception unit 6, for each of the antennas 2 and 3. Specifically, the communication level obtainment unit 8 obtains RSSI obtained through the communication performed by the pairs each including one of the first antenna 2 and the second antenna 3 and one of the stations 230 to 270 as shown in FIG. 4. The communication level obtainment unit 8 then causes the storage unit 7 to store the RSSI obtained through the communication performed by the pairs, as an antenna table in which the obtained RSSIs are associated with the antennas 2 and 3 and the stations 230 to 270. Furthermore, the communication level obtainment unit 8 updates the antenna table stored in the storage unit 7 every time the reception unit 6 receives ACK.

The count unit 9 counts the number of established communications for each of the first antenna 2 and the second antenna 3. Here, the number of established communications is the number of one or more of the stations which successfully established communication through a single antenna. For example, when the communication apparatus 1 successfully established wireless communication with three stations that are the photovoltaics 230, the fuel cell 250, and the TV 270 through the first antenna 2, the number of established communications for the first antenna 2 is three. The count unit 9 counts the number of stations whose values of RSSI are recorded in the antenna table stored in the storage unit 7 as the number of established communications, for each of the first antenna 2 and the second antenna 3. In other words, when the value of RSSI is recorded in the antenna table, the count unit 9 determines that the communication for obtaining RSSI is established. Instead of counting the number of stations whose RSSIs are recorded in the antenna table as the number of established communications as described above, the count unit 9 may count the number of stations successfully established communication between the antennas 2 and 3 and the stations 230 to 240, and cause the storage unit 7 to store the numbers separately from the antenna table.

The determination unit 10 determines whether or not a total number of antennas whose numbers of established communications counted by the count unit 9 are greatest is more than one. In other words, the determination unit 10 determines whether there is a case where the total number of antennas whose number of established communications is greatest cannot be narrowed down to one.

When it is determined by the determination unit 10 that the total number of antennas whose numbers of established communications are greatest is more than one, the antenna control unit 11 identifies a station corresponding to the lowest RSSI among the RSSIs stored in the antenna table recorded in the storage unit 7. Then, the antenna control unit 11 selects an antenna having the higher RSSI among the RSSIs of the identified station through the antennas 2 and 3, and holds antenna selection information indicating that the antenna is selected. When the transmission unit 5 performs broadcasting, the antenna control unit 11 receives from the transmission unit 5 the control signal for selecting the antenna for use in broadcasting, and transmits the control signal for selecting the antenna indicated in the held antenna selection information to the switch unit 4. In other words, the communication apparatus 1 determines the antenna for use in broadcasting among the first antenna 2 and the second antenna 3 based on the antenna table, prior to performing broadcasting. It is to be noted that the switch unit 4 combined with the antenna control unit 11 serve as the antenna selection unit 12. Specifically, the antenna control unit 11 transmits the above control signal to the switch unit 4, and the switch unit 4 switches between the antennas in response to the control signal, thereby selecting the antenna as the antenna selection unit 12 does. Since the antenna table is updated by the communication level obtainment unit 8 as described above, the antenna selection unit 12 selects the antenna based on the updated, current antenna table. Furthermore, when it is determined by the determination unit 10 that the total number of antennas whose numbers of established communications are greatest is not more than one, the antenna control unit 11 selects the antenna whose number of established communications is the greatest.

FIG. 4 is a flowchart illustrating a flow of broadcast processing according to Embodiment 1 of the present invention.

First, when broadcasting, the communication apparatus 1 creates an antenna table for selecting an antenna for use in broadcasting (S100). The antenna table creation processing will be detailed later with reference to FIG. 5.

Next, the communication apparatus 1 selects one of the first antenna 2 and the second antenna 3 as the antenna for use in broadcasting, based on the created antenna table (S200). The antenna-for-broadcast selection processing will be detailed later with reference to FIG. 7.

Finally, the communication apparatus 1 broadcasts predetermined data to the stations 230 to 270 through the selected antenna (S300), and the processing is finished.

Figure 5:
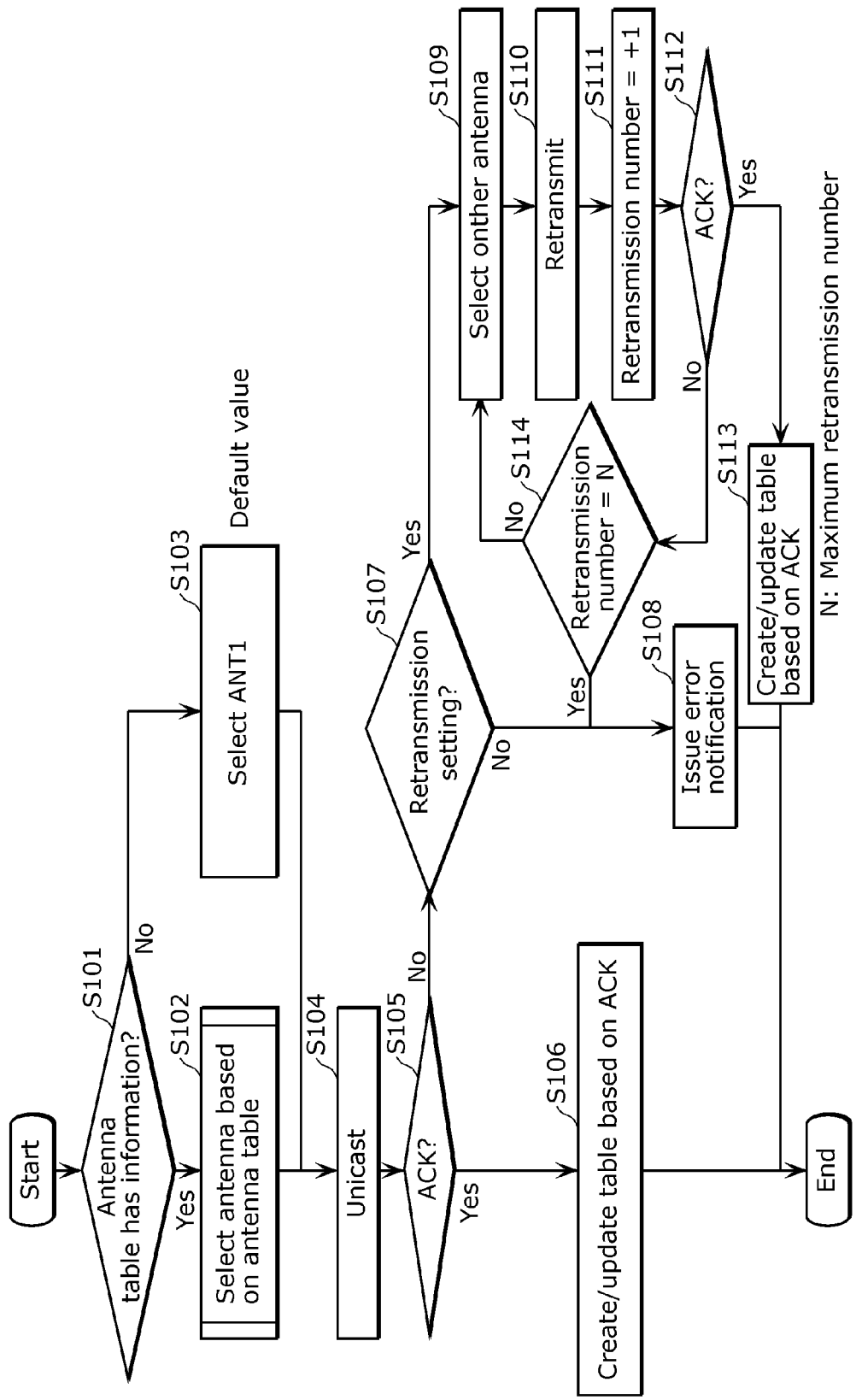
FIG. 5 is a flowchart illustrating a flow of antenna table creation processing according to Embodiment 1 of the present invention.

FIG. 5 is a flowchart illustrating a flow of antenna table creation processing according to Embodiment 1 of the present invention.

The antenna table creation processing is performed by the communication level obtainment unit 8 obtaining the RSSI obtained when ACK is received from each of the stations 230 to 270. As described above, ACK indicates, when data is unicasted to each of the stations 230 to 270, that the unicasted data is successfully received by each of the stations 230 to 270.

First, the transmission unit 5 determines whether or not information, that indicates RSSI obtained when the ACK is received from the station to be target of unicast, is in the antenna table stored in the storage unit 7 (S101).

When it is determined by the transmission unit 5 that the information indicating RSSI is in the antenna table (S101: Yes), the antenna selection unit 12 selects, based on the antenna table, an optimal antenna for the station among the first antenna 2 and the second antenna 3 (S102). Specifically, the antenna control unit 11 selects the optimal antenna among the first antenna 2 and the second antenna 3, transmits to the switch unit 4 a control signal for connecting the transmission unit 5 and the selected antenna, and causes the switch unit 4 to connect the transmission unit 5 and the selected antenna. Details of the processing for selecting an optimal antenna based on the antenna table here is described later with reference to FIG. 6.

Figure 6:
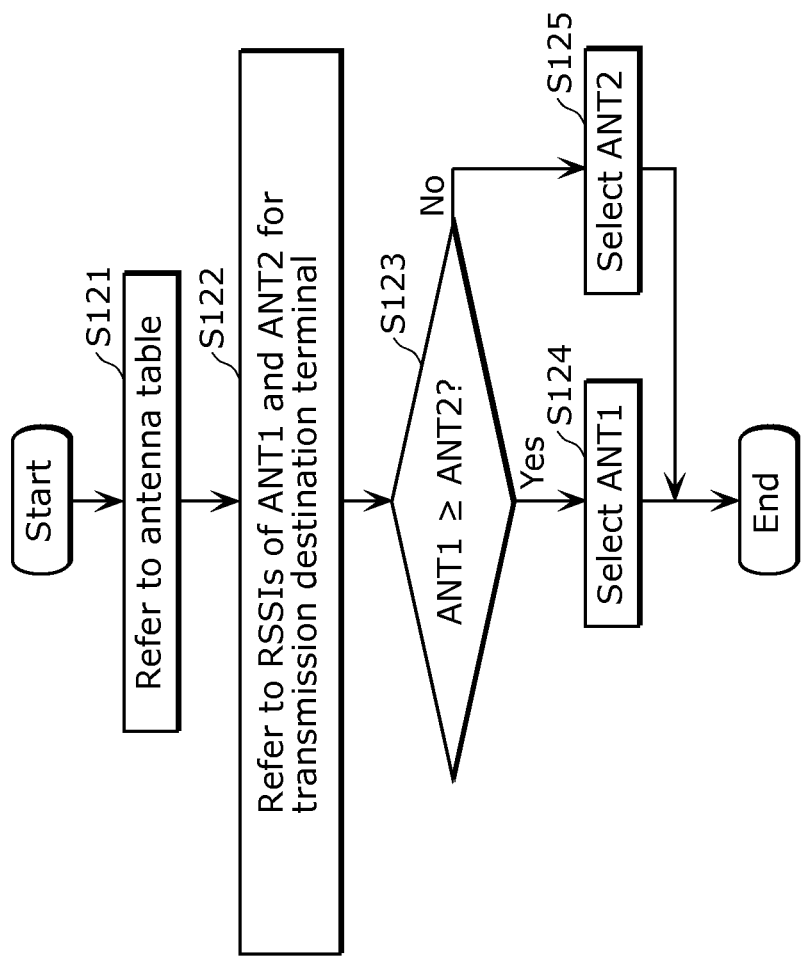
FIG. 6 is a flowchart illustrating a flow of processing for selecting an antenna for unicasting according to Embodiment 1 of the present invention.

FIG. 6 is a flowchart illustrating a flow of processing for selecting an antenna for use in unicasting according to Embodiment 1 of the present invention. In other words, FIG. 6 details the antenna selection processing performed when unicast is performed in S102.

First, the determination unit 10 refers to the antenna table stored in the storage unit 7 (S121).

Next, the determination unit 10 refers to (i) RSSI (hereinafter referred to as "RSSI1") obtained when ACK is received at the first antenna 2 ("ANT1" in FIG. 6), and (ii) RSSI (hereinafter referred to as "RSSI2") obtained when ACK is received at the second antenna 3 ("ANT2" in FIG. 6), of the station to be target of unicast (that is the transmission destination terminal) (S122).

Then, the determination unit 10 determines whether or not RSSI1 is higher than or equal to RSSI2 (S123).

When it is determined that RSSI1 is higher than or equal to RSSI2 (S123: Yes), the antenna selection unit 12 selects the first antenna 2 (S124). When it is determined that RSSI1 is lower than RSSI2 (S123: No), the second antenna 3 is selected (S125).

When S124 or S125 is performed, the antenna-for-unicast selection processing is finished.

Referring back to FIG. 5, when it is determined by the transmission unit 5 that the antenna table does not have information indicating RSSI (S101: No), the antenna selection unit 12 selects the first antenna 2 ("ANT1" in FIG. 5) which is preset as a default value (S103).

Then, the transmission unit 5 performs unicast to the target station through the antenna selected in S102 or S103 (S104). The data transmitted from the communication apparatus 1, that is the access point, to each of the stations 230 to 270 in unicasting is as described above.

Next, the communication level obtainment unit 8 determines whether or not the reception unit 6 has received the ACK from the target station of unicast performed in S104 (S105).

When it is determined that the reception unit 6 has received the ACK (S105: Yes), the communication level obtainment unit 8 obtains the RSSI obtained when ACK is received and stores the RSSI to the part (cell), in the antenna table, corresponding to the station which transmitted the ACK and the antenna which received the ACK, to create or update the antenna table (S106).

When it is determined that the reception unit 6 has not received the ACK (S105: No), the transmission unit 5 determines whether or not there is a retransmission setting for the unicast performed in S104 (S107).

When it is determined that there is no retransmission setting (S107: No), the transmission unit 5 issues an error notification indicating that the ACK has not been obtained (S108).

When it is determined that there is the retransmission setting (S107: Yes), the antenna selection unit 12 selects an antenna other than the antenna selected for the last unicast (the other antenna) (S109).

The transmission unit 5 retransmits the unicast through the antenna selected in S109 (S110).

After the retransmission, the transmission unit 5 increments the retransmission count indicating the number of retransmissions by one (S111).

Then, the communication level obtainment unit 8 determines whether or not the reception unit 6 has received the ACK from the target station of unicast performed in S110 (S112).

When it is determined that the reception unit 6 has received the ACK (S112: Yes), the antenna table is created or updated (S113) by, as described in S106, the communication level obtainment unit 8 obtaining the RSSI obtained when the ACK is received and storing the RSSI to the part (cell), in the antenna table, corresponding to the station which transmitted the ACK and the antenna which received the ACK.

When it is determined that the reception unit 6 has not received the ACK (S112: No), the transmission unit 5 determines whether or not the retransmission count is greater than or equal to N times (two times, for example) that is predetermined (S114).

When it is determined that the retransmission count is greater than or equal to N times that is predetermined (S114: Yes), the transmission unit 5 issues an error notification of S108. When it is determined that the retransmission count is smaller than N times that is predetermined (S114: No), the processing returns to S109.

When one of (i) the antenna table creation/update in S106 or S113 and (ii) the error notification in S108 is performed, the antenna table creation processing for a single station is finished.

The antenna table creation processing is performed every time unicast to the stations 230 to 270 is performed, and the antenna table is constantly updated with the current RSSI.

Figure 7:
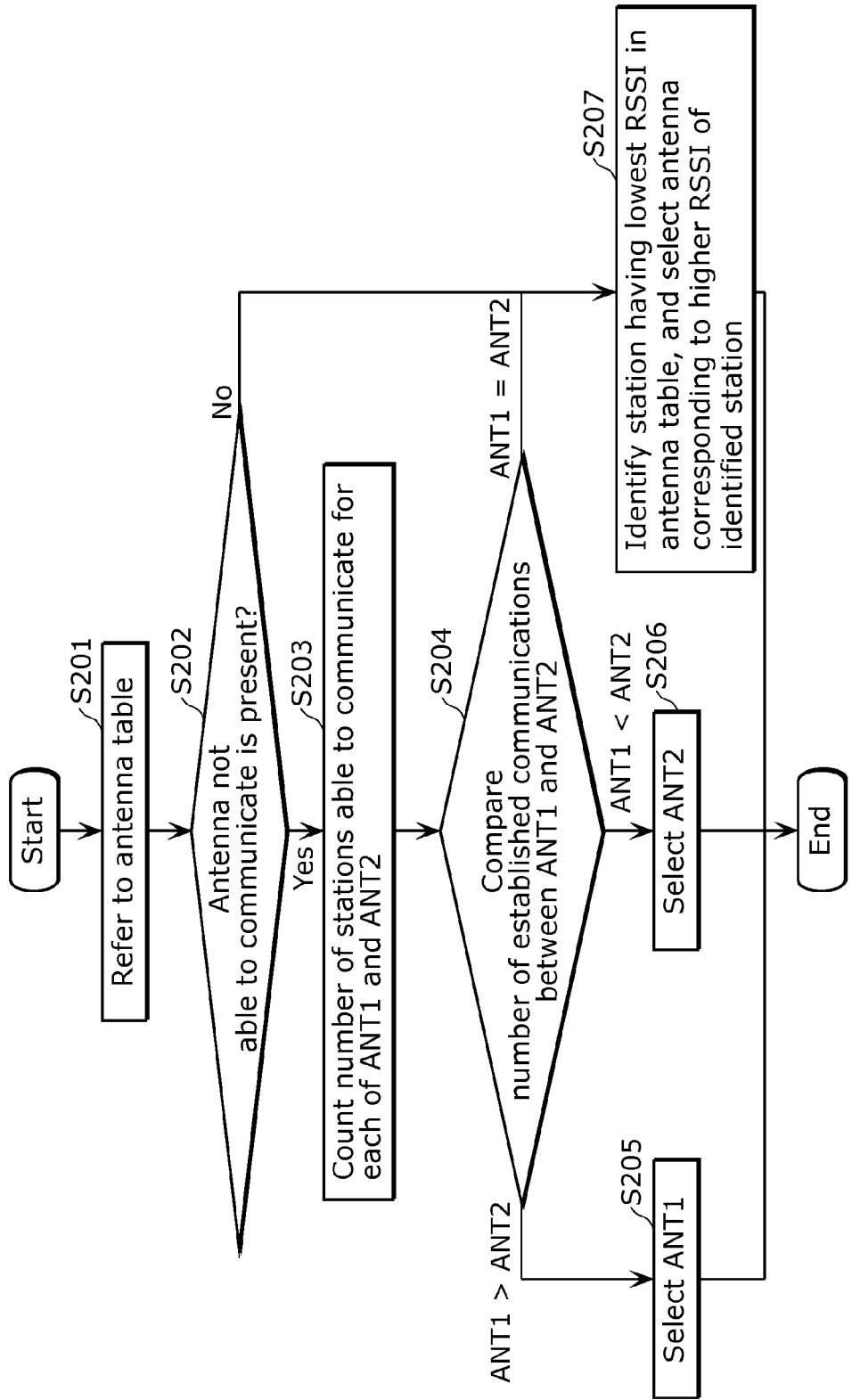
FIG. 7 is a flowchart illustrating a flow of processing for selecting an antenna for broadcasting according to Embodiment 1 of the present invention.

FIG. 7 is a flowchart illustrating a flow of processing for antenna-for-broadcast selection processing according to Embodiment 1. In other words, FIG. 7 details the antenna-for-broadcast selection processing in S200.

First, the determination unit 10 refers to the antenna table stored in the storage unit 7 (S201).

Next, the determination unit 10 determines whether or not there is an antenna which is unable to communicate among the first antenna 2 and the second antenna 3 (S202).

The count unit 9 counts, for each of the first antenna 2 ("ANT1" in FIG. 7) and the second antenna 3 ("ANT2" in FIG. 7), the number of stations which is able to communicate through the antenna (S203). In other words, the count unit 9 counts the number of established wireless communications for each of the antennas 2 and 3.

The determination unit 10 compares the number of established communications for the first antenna 2 and the number of established communications for the second antenna 3 (S204). Specifically, it is determined whether or not one of the number of established communications for the first antenna 2 and the number of established communications for the second antenna 3 is greater or the numbers are equal.

When it is determined by the determination unit 10 that the number of established communications with the first antenna 2 is greater than the number of established communications with the second antenna 3 (S204: ANT1>ANT2), the antenna selection unit 12 selects the first antenna 2 (S205).

When it is determined by the determination unit 10 that the number of established communications for the first antenna 2 is smaller than the number of established communications for the second antenna 3 (S204: ANT1<ANT2), the antenna selection unit 12 selects the second antenna 3 (S206).

When it is determined by the determination unit 10 that the number of established communications for the first antenna 2 is equal to the number of established communications for the second antenna 3 (S204: ANT1=ANT2), or that both the first antenna 2 and the second antenna 3 are able to communicate (S202: No), the antenna selection unit 12 searches the antenna table for a station corresponding to the lowest value of RSSI, and selects one of the antennas corresponding to the higher RSSIs among the RSSIs of the station (S207). When it is determined "No" in S202, the number of established communications for the first antenna 2 is the number of stations (that is the greatest number) and the number of established communications for the second antenna 3 is the number of stations (that is the greatest number), which means the numbers of established communications are equal. In other words, in S204, the condition is the same as for the case where it is determined by the determination unit 10 that the number of established communications for the first antenna 2 and the number of established communications for the second antenna 3 are equal. Thus, S202 in the flowchart in FIG. 7 may be omitted.

FIG. 8 illustrates an example of the antenna table. In FIG. 8, (a) illustrates a case where the numbers of established communications for the first antenna 2 and the second antenna 2 are not equal, and (b) illustrates a case where the numbers of established communications for the first antenna 2 and the second antenna 3 are equal.

For example, (a) in FIG. 8 shows that (i) RSSI, that is the reception level obtained when the communication apparatus 1 (access point) received through the first antenna 2 the ACK transmitted from the station A111, is −93 dBm, and (ii) the ACK was not received through the second antenna 3. Likewise, the RSSI obtained when the ACK from the station B112 is received through the first antenna 2 is −80 dBm, and that received through the second antenna 3 is −70 dBm. The RSSI obtained when the ACK from the station C113 is received through the first antenna 2 is −85 dBm, and that received through the second antenna 3 is −80 dBm. The RSSI obtained when the ACK from the station D114 is received through the first antenna 2 is −75 dBm, and that received through the second antenna 3 is −60 dBm. As described above, the ACK from the station A111 was not received through the second antenna 3, and the ACK from the other stations B112 to D114 were received through both the first antenna 2 and the second antenna 3.

In such a case, in S203 in the flowchart in FIG. 7, the number of established communications for the first antenna 2 is counted as "4", and the number of established communications for the second antenna 3 is counted as "3", by the count unit 9. Thus, in S204, the determination unit 10 determines that the number of established communications for the first antenna 2 is greater than the number of established communications for the second antenna 3, the processing proceeds to S205, and the first antenna 2 is selected as the antenna for use in broadcasting.

On the other hand, when an RSSI which is not detected in (a) in FIG. 8 is detected as shown in (b) in FIG. 8, the antenna is selected in the following manner. In other words, assume a case where −80 dBm is detected as the RSSI obtained when the communication apparatus 1 received through the second antenna 3 the ACK transmitted from the station A111. In such a case, in S202 in the flowchart in FIG. 7, the determination unit 10 determines that both the first antenna 2 and the second antenna 3 are able to communicate, and processing proceeds to S207. As for the flow in which S202 is omitted, the determination unit 10 determines in S204 that the number of established communications for the first antenna 2 is equal to the number of established communications for the second antenna 3, and the processing proceeds to S207.

Then, in S207, the second antenna 3 corresponding to −80 dBm, that is the higher RSSI of the station A111 having the lowest RSSI of −93 dBm among the eight values in the antenna table, is selected.

In FIG. 9, (a) shows an example of the antenna table, which is the same antenna table as (b) in FIG. 8. In FIG. 9, (b) shows the determination on communication in the case where the first antenna 2 is selected and fading of −5 dBm occurs, and (c) shows the determination on communication in the case where the second antenna 3 is selected and fading of −5 dBm occurs.

Assume that the communication apparatus 1 cannot receive the ACK when the RSSI is lower than −94 dBm, and can receive the ACK when RSSI is higher than or equal to −94 dBm. As shown in (b) in FIG. 9, when the first antenna 2 is selected and fading of −5 dBm occurs, RSSIs of all of the stations A111 to D114 become lower than −94 dBm, and thus all of the stations A111 to D114 become unable to communicate. However, as shown in (c) in FIG. 9, when the second antenna 3 is selected and even when fading of −5 dBm occurs in the same manner, RSSIs of all of the stations A111 to D114 are higher than or equal to −94 dBm, and thus all of the stations A111 to D114 remain able to communicate. Since (a) in FIG. 9 is the same antenna table as that in (b) in FIG. 8, the second antenna 3 is selected in the present embodiment. In other words, in the present embodiment, the antenna which is less affected by fading is selected.

Figure 10:
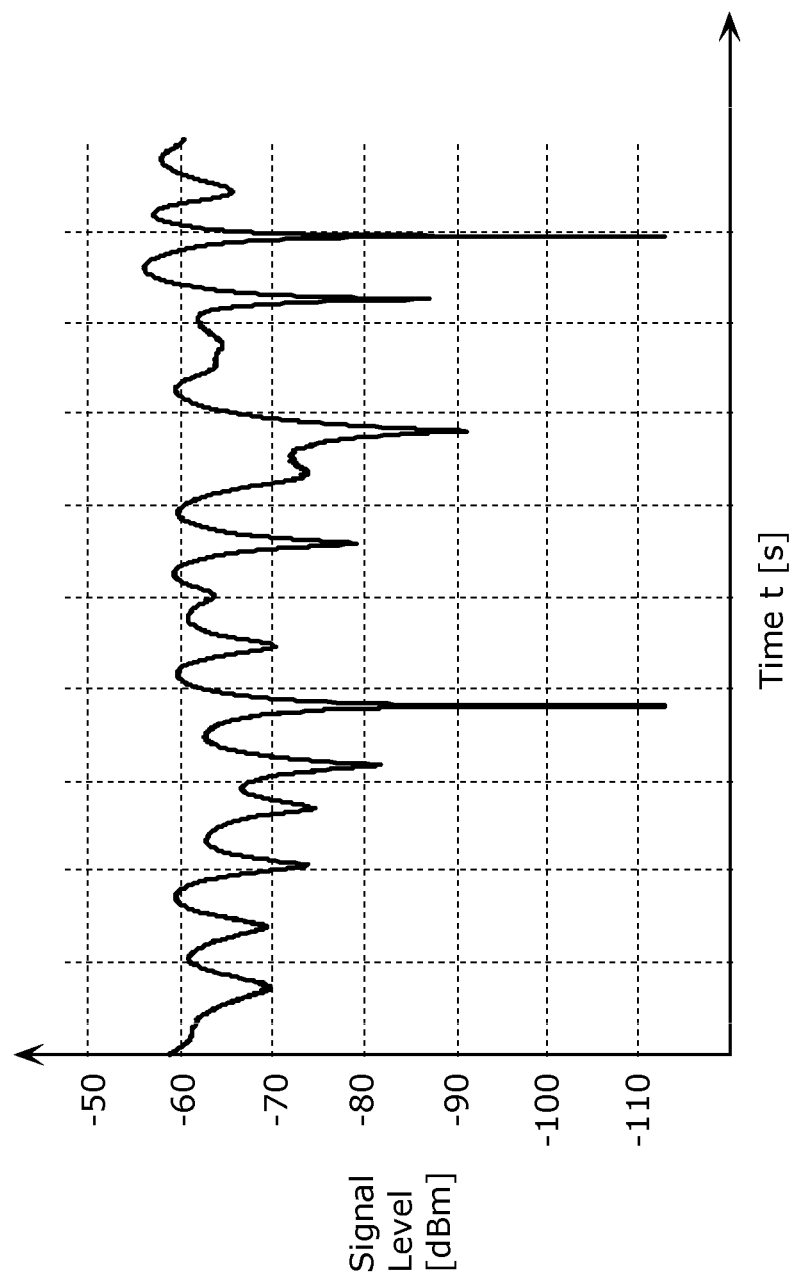
FIG. 10 illustrates an example of RSSI fading variation.

FIG. 10 illustrates an example of RSSI fading variation.

As shown in FIG. 10, RSSI is not always constant but varies temporally by a unit of at least approximately 10 dBm according to the change in the circumference environment such as in radio wave interference.

With the communication apparatus 1 according to the present embodiment, when the numbers of established communications for the two antennas are equal to each other, one of the stations corresponding to the lowest RSSI among the RSSIs in the antenna table is identified, and one of the antennas corresponding to the higher communication levels among the RSSIs of the pairs corresponding to the identified station is selected. In other words, at least the antenna corresponding to the lowest RSSI among the RSSIs in the antenna table is not selected. Furthermore, since a station corresponding to the lowest RSSI is focused, the antenna through which the station is likely to be able to communicate is selected, using as a reference the station which has the worst conditions for communication with the communication apparatus 1. Since the antenna having the better communication condition is selected for the station having the worst communication conditions as described above, even when it is determined that the number of established communications for the first antenna 2 is equal to the number of established communications for the second antenna 3, the second antenna 3 which has the better communication condition can be surely selected. In other words, the optimal antenna is selected for the station having poor reception even when the RSSI varies temporally due to the fading, which reduces the stations unable to communicate and realizes stable communications.

Figure 11:
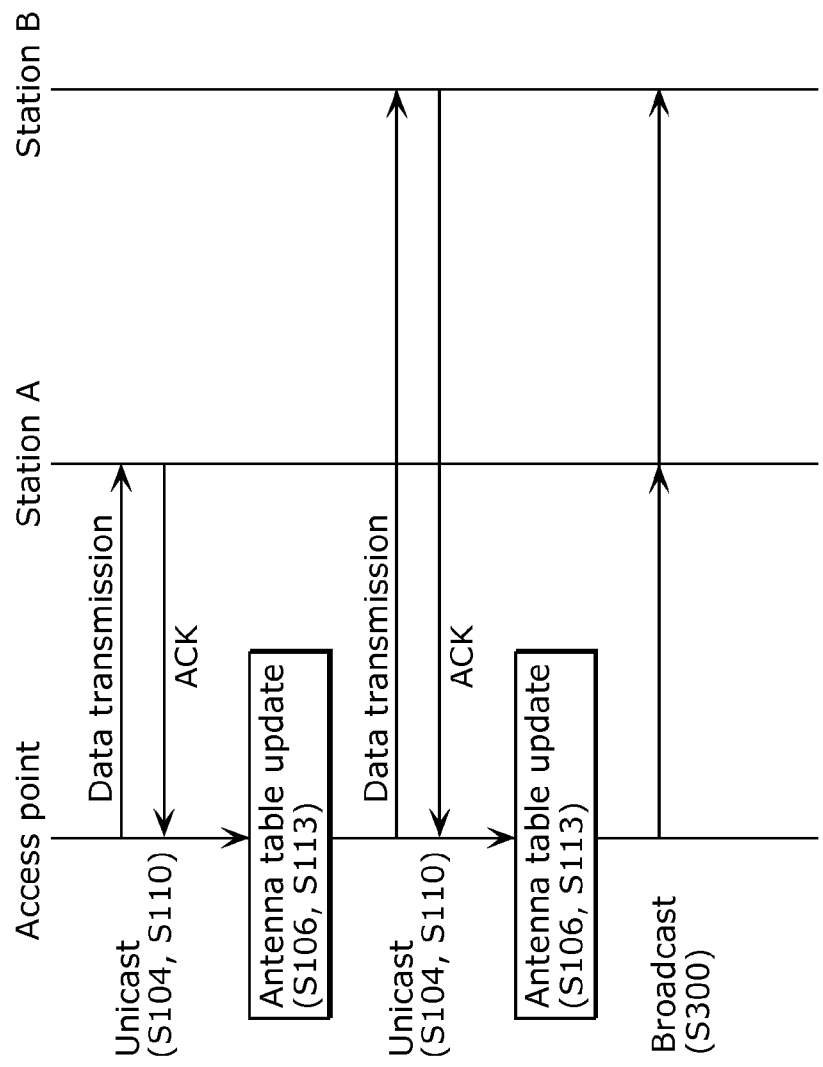
FIG. 11 illustrates a sequence diagram between the access point and the station A and the station B in the broadcast processing.

FIG. 11 illustrates a sequence diagram between the access point and the stations A and B in the broadcast processing. Here, since the same processing is performed on the station C and the station D, the description is provided only on the station A and the station B.

As shown in FIG. 11, the unicast performed in S104 or S110 described with reference to FIG. 5 is performed from the access point to the station A that is one of the stations. When unicast is performed to the station A, the access point receives the ACK from the station A. Here, the access point obtains, by the communication level obtainment unit 8, the RSSI obtained when the ACK is received, and creates or updates the antenna table corresponding to the station A, as described in S106 or S113 in FIG. 5. Next, by the access point performing unicast to the station B, the access point receives the ACK from the station B. Here, too, the access point obtains the RSSI obtained when the ACK is received by the communication level obtainment unit 8, and creates or updates the antenna table corresponding to the station B. Although not described here, the access point performs unicast to the station C and the station D in the same manner, obtains the RSSI obtained when the ACK is received from each of the stations, and creates or updates the antenna table corresponding to the station C and station D.

Then, the access point selects the antenna for use in broadcasting, which is selected in the processing flow in FIG. 7, and performs broadcast in S300 to all of the stations.

Embodiment 2

In the communication apparatus 1 according to Embodiment 1 above, when it is determined that the number of established communications for the first antenna 2 and the number of established communications for the second antenna 3 are equal in S202 or S204 in the antenna-for-broadcast selection processing described in FIG. 7, one of the stations corresponding to the lowest RSSI among the all the RSSIs stored in the antenna table is identified and one of the antennas corresponding to the higher RSSIs among the RSSIs of the station is selected. However, this is not an only example. For example, the antenna for use in broadcasting may be selected using the flowchart as shown in FIG. 12.

Figure 12:
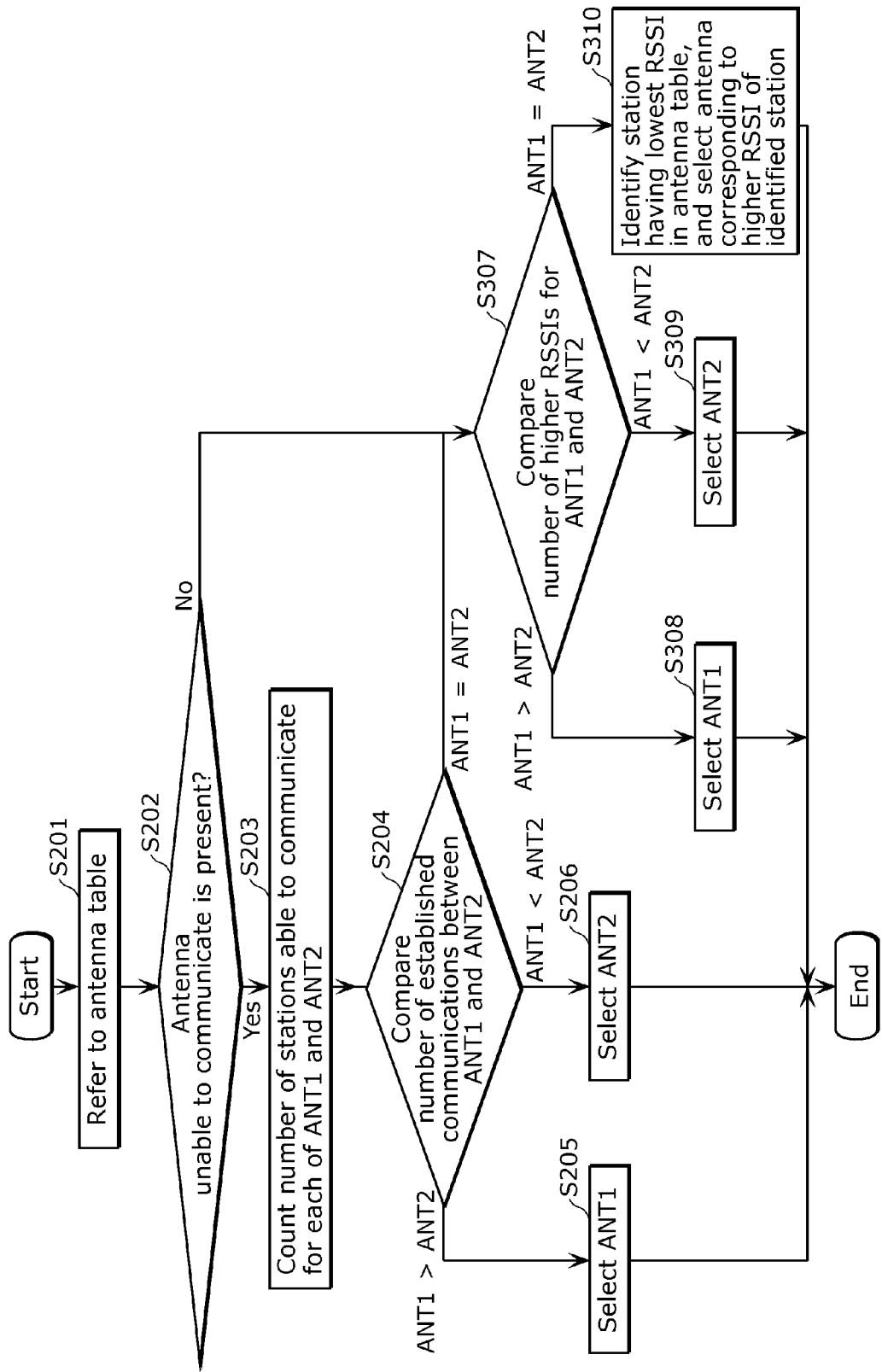
FIG. 12 is a flowchart illustrating a flow of processing for selecting an antenna for broadcast according to Embodiment 2.

FIG. 12 is a flowchart illustrating a flow of the antenna-for-broadcast selection processing according to Embodiment 2 of the present invention.

Here, description is provided only on structures and processing different from those in Embodiment 1, and description on the common structures and processing is omitted.

In the communication apparatus 1 according to Embodiment 2, the count unit 9 further counts, for each of the first antenna 2 and the second antenna 3, the number of highest level terminals that is the number of one or more of the stations whose RSSI for the antenna is highest.

Furthermore, the determination unit 10 further determines whether or not the number of highest level terminals for the first antenna 2 counted by the count unit 9 is equal to that of the second antenna 3 (S307).

When it is determined by the determination unit 10 that the number of highest level terminals for the first antenna 2 is greater than the number of highest level terminals for the second antenna 3 (S307: ANT1>ANT2), the antenna selection unit 12 selects the first antenna 2 (S308).

When it is determined by the determination unit 10 that the number of highest level terminals for the first antenna 2 is smaller than the number of highest level terminals for the second antenna 3 (S307: ANT1<ANT2), the antenna selection unit 12 selects the second antenna 3 (S309).

Furthermore, when it is determined by the determination unit 10 that the number of highest level terminals for the first antenna 2 is equal to the number of the highest level terminals for the second antenna 3, the antenna selection unit 12 identifies one of the stations corresponding to the lowest RSSI among the RSSIs obtained by the communication level obtainment unit 8 and stored in the antenna table, and selects one of the antennas corresponding to the communication levels higher than the lowest communication level among the RSSIs of the identified station for the first antenna 2 and the second antenna 3 (S310).

It is to be noted that in the communication apparatus 1 according to Embodiment 2, the determination in S307 is performed instead of S207, when it is determined in S202 or S204 in the flowchart in FIG. 7 that the number of established communications for the first antenna 2 is equal to the number of established communications for the second antenna 3.

As described above, selecting the antenna having the greater number of highest level terminals allows selecting the antenna which is capable of communicating more robustly among the first antenna 2 and the second antenna 3.

Other Embodiments

Although the communication apparatus 1 according to the above embodiments includes plural antennas that are two antennas namely the first antenna 2 and the second antenna 3, three or more antennas can also be adopted.

In this case, the flowchart in FIG. 7 of Embodiment 1 is changed as follows, for example. Here, description is provided only on the part which has been changed to cover three or more antennas, and description on the same steps is omitted.

Instead of S203, the count unit 9 counts the number of established communications for each of the plural antennas. Next, instead of S204, the determination unit 10 determines whether or not a total number of antennas whose numbers of established communications counted by the count unit 9 are greatest is more than one. Then, when it is determined by the determination unit 10 that the total number of antennas whose numbers of established communications are greatest is more than one, the antenna selection unit 12 identifies, instead of S207, one of the stations corresponding to the lowest RSSI among the RSSIs of the pairs obtained by the communication level obtainment unit 8, and selects one of the antennas corresponding to the highest RSSI among the RSSIs of the identified station through the antennas, as the antenna for use in broadcasting. Furthermore, when it is determined by the determination unit 10 that the total number of antennas whose numbers of established communications are greatest is not more than one, the antenna control unit 12 selects, instead of S205 or S206, the antenna whose number of established communications is greatest. In this manner, the present invention can be applied to the case where the communication apparatus 1 according to Embodiment 1 includes three or more antennas.

Furthermore, the communication apparatus 1 according to Embodiment 2 may also include three or more antennas. The flowchart in this case is as follows, for example. Again, description is provided only on the part which has been changed to cover three or more antennas, and description on the same steps is omitted.

In Embodiment 2, when the communication apparatus 1 according to Embodiment 1 described above includes three or more antennas, the count unit 9 further counts the number of highest level terminals for each of the antennas. The number of highest level terminals is the number of one or more of the stations whose RSSI through the antenna is highest. The determination unit 10 further determines, instead of S307, whether or not a total number of antennas whose number of highest level terminals counted by the count unit 9 is greatest is more than one. When it is determined by the determination unit 10 that the total number of antennas whose numbers of established communications are greatest is more than one (S202: No or S204: ANT1=ANT2) and that the total number of antennas whose numbers of highest level terminals are greatest is more than one, the antenna selection unit 12 identifies one of the stations corresponding to the lowest communication level among the communication levels of the pairs obtained by the communication level obtainment unit 8, and selects, as the antenna for use in the broadcasting, one of the antennas corresponding to the highest communication level among the RSSIs of the identified station through the antennas. In this manner, the present invention can be applied to the case where the communication apparatus 1 according to Embodiment 2 includes three or more antennas.

In the above case, when it is determined by the determination unit 10 that the total number of antennas whose numbers of established communications are greatest is more than one, one of the stations corresponding to the lowest RSSI is identified, and one of the antennas corresponding to the highest RSSI among the RSSIs of the identified station through the antennas is selected as the antenna for use in broadcasting. This is not an only example. However, it is possible to select one of the antennas having good communication conditions even when an antenna corresponding to the RSSI higher than the lowest RSSI, that is not the highest RSSI, is selected. Thus, the advantageous effect of reducing the effect of fading can be produced.

Although it is not particularly mentioned in the communication apparatus 1 according to the above embodiment, the antenna selection unit 12 switches the antenna for reception from the first antenna 2 to the second antenna 3, while the reception unit 6 is receiving the ACK from each of the stations A111 to D114 in S105 or S112. In other words, since the reception unit 6 switches the antenna for reception from the first antenna 2 to the second antenna 3 while receiving a single ACK from a station, the reception unit 6 receives the ACK using the two antennas 2 and 3. Thus, the communication level obtainment unit 8 can obtain both the RSSI from a station through the first antenna 2 and the RSSI from the station through the second antenna 3 while receiving the single ACK. Thus, the RSSIs through the two antennas 2 and 3 can be obtained without obtaining ACK plural times from a single station. This reduces the time it takes for obtaining the RSSI from each of the stations through the two antennas 2 and 3, as compared to the case where the antenna for reception is fixed for a single ACK.

It is to be noted that this embodiment can be applied not only to the case where the communication apparatus 1 includes two antennas but also to the case of three or more antennas. In other words, the antenna selection unit 12 switches the antenna for the reception while the reception unit 6 is receiving the ACK from the stations. The communication level obtainment unit 8 then obtains RSSI for each of the antennas used for the reception, and stores the obtained RSSI into the antenna table.

On the other hand, the communication apparatus 1 may be structured to receive the ACK with a fixed antenna, without switching between the two antennas 2 and 3. In other words, the antenna selection unit 12 fixes the antenna for use in the reception to the first antenna 2 until measurement of the RSSI between one of the antennas 2 and 3 (here, the first antenna 2) and all of the stations A111 to D114 is completed in a time period during which the reception unit 6 is receiving ACK from each of the stations A111 to D114 in S105 or S112. Then, when the measurement of RSSI on the first antenna 2 is completed for all of the stations A111 to D114, the antenna selection unit 12 switches to the second antenna 3 on which the measurement of RSSI between the stations A111 to D114 is not completed, among the first antenna 2 and the second antenna 3.

This embodiment can also be applied not only to the case where the communication apparatus 1 includes two antennas but also to the case of three or more antennas. In other words, the antenna selection unit 12 fixes the antenna for use in the reception to any one of the plural antennas until measurement of the RSSI between the antenna and all of the stations A111 to A270 is completed in a time period during which the reception unit 6 is receiving the ACK from the station. Then, when the reception level measurement on the antenna is completed for all of the stations A111 to D114, the antenna selection unit 12 switches to the antenna, among the antennas, on which the measurement of reception level between the other communication apparatuses is not completed, and fixes the antenna for the reception until the RSSI measurement on the antenna after the switch between all of the stations A111 to A270 is completed. Then, the antenna selection unit 12 repeats antenna switching until the measurement of RSSI is completed for the entire antenna tables. The communication level obtainment unit 8 obtains RSSIs for each of the antennas used for the reception, and stores the obtained RSSIs into the antenna table.

The RSSI measurement for storing RSSI into the antenna table includes an attempt of measurement, since communication is not always secured. In other words, even when the communication is not established, it is regarded that the measurement on communication between the station and the antenna is carried out.

In the communication apparatus 1 according to Embodiment 1 above, the communication level obtainment unit 8 obtains and stores into the antenna table, as the communication level, the RSSI obtained when the reception unit 6 receives the ACK transmitted from each station. However, obtaining the RSSI obtained when the ACK transmitted from each station is received is not an only example. For example, the communication apparatus 1 that is the access point may obtain the RSSI by measuring the RSSI when each station receives the data unicasted from the access point and transmitting the measured RSSI data to the communication apparatus 1. In this case, it is required for the access point or the station to store the antenna used by the access point for the unicast.

In the communication apparatus 1 according to the above embodiment, the RSSI obtained when the ACK, which is transmitted from the station as a result of the unicast performed by the communication apparatus 1, is obtained for obtaining the RSSI for creating the antenna table. However, the ACK transmitted from each station in unicasting is not an only example, and the RSSI obtained when the ACK transmitted from each station in broadcasting is received may be used. In general, a large amount of ACK is transmitted from each station at once. Thus, the ACK is not transmitted from each station in broadcasting. However, when the communication apparatus 1 is capable of processing the ACK from each station at once, the structure is possible in which ACK is received in broadcasting.

It is to be noted that in each of the above non-limiting embodiments, each constituent element may be implemented by being configured with a dedicated hardware or being executed by a software program appropriate for each constituent element. Each constituent element may be implemented by reading and executing the software program recorded on a hard disk or a recording medium such as a semiconductor memory, performed by a program execution unit such as a CPU or a processor. Here, the software which implements an information terminal device or the like in each of the above non-limiting embodiments is a program described below.

Specifically, the program is of a communication method for use in a communication apparatus which communicates data with a plurality of other communication apparatuses by performing wireless communication and includes a plurality of antennas which transmit and receive a radio wave for the wireless communication, the communication method including: obtaining communication levels obtained when the communication apparatus performed the wireless communication with the other communication apparatuses, the communication levels being obtained for a plurality of pairs each including one of the antennas and one of the other communication apparatuses; counting, for each of the antennas, the number of established communications that is the number of one or more of the other communication apparatuses which successfully established communication through the antenna; determining whether or not a total number of antennas whose numbers of established communications counted in the counting are greatest is more than one; when it is determined in the determining that the total number of antennas whose numbers of established communications are greatest is more than one, identifying one of the other communication apparatuses corresponding to a lowest communication level among the communication levels of the pairs obtained in the obtaining, and selecting, as an antenna for use in broadcasting, one of the antennas corresponding to communication levels higher than the lowest communication level among the communication levels of the identified other communication apparatus through the antennas; and broadcasting predetermined data to the other communication apparatuses through the antenna selected in the selecting.

It is to be noted that although the present invention is described based on aforementioned embodiment, the present invention is obviously not limited to such embodiment. The following cases are also included in the present invention.

(1) Specifically, each of the aforementioned apparatuses can be implemented with a computer system including a microprocessor, a ROM, a RAM, a hard disk unit, a display unit, a keyboard, a mouse, and the like. RAM or hard disc unit stores a computer program. The respective apparatuses achieve their functions through the microprocessor's operation according to the computer program. Here, the computer program is configured by combining plural instruction codes indicating instructions for the computer, in order to achieve predetermined functions.

(2) All or a part of the constituent elements included in the above device may include a single system large scale integration (LSI). The System LSI is a super multifunctional LSI manufactured by integrating plural constituent elements on a single chip, and is specifically a computer system including a microprocessor, a ROM, a RAM, and so on. ROM stores a computer program. As the microprocessor loads a computer program from the ROM to the RAM and operates arithmetic operation or the like according to the loaded computer program, the system LSI performs its functions.

(3) Some or all of the constituent elements included in each of the respective apparatuses may be configured as an IC card which can be attached and detached from the respective apparatuses or as a stand-alone module. The IC card or the module may be a computer system including the microprocessor, ROM, RAM, and the like. The IC card or the module may also include the aforementioned super-multi-function LSI. The IC card or the module achieves its function through the microprocessor's operation according to the computer program. The IC card or the module may have tamper resistant.

(4) The present invention may be implemented with the method described above. The present invention may also be implemented with a computer program which implements such a method with a computer or a digital signal formed of a computer program.

Furthermore, the present invention may be realized by a computer-readable recording medium in which a computer program or digital signal is recorded, such as a flexible disk, hard disk, CD-ROM, MO, DVD, DVD-ROM, DVD-RAM, BD (Blu-ray (registered trademark) Disc), a semiconductor memory. The present invention may also be implemented with the digital signal recorded on these recording media.

Furthermore, the present invention may also be realized by the transmission of the aforementioned computer program or digital signal via a telecommunication line, a wireless or wired communication line, a network represented by the Internet, a data broadcast and so forth.

The present invention may also be a computer system including a microprocessor and a memory, in which the memory stores the aforementioned computer program and the microprocessor operates according to the computer program.

Furthermore, by transferring the program or the digital signal by recording onto the aforementioned recording media, or by transferring the program or digital signal via the aforementioned network and the like, execution using another independent computer system is also made possible.

(5) Each of the above embodiment and modification examples may be combined.

The foregoing has described the image processing apparatus according to one or more embodiments of the present invention, however, the present invention is not limited to these embodiments. Other forms in which various modifications apparent to those skilled in the art are applied to the embodiments, or forms structured by combining constituent elements of different embodiments are included within the scope of the present invention, unless such changes and modifications depart from the scope of the present invention.

INDUSTRIAL APPLICABILITY

The present invention is useful as a communication apparatus and so on including plural antennas, in a wireless communication network in which the number of other communication apparatuses capable of performing wireless communication with the communication apparatus can be increased.

REFERENCE SIGNS LIST

1 Communication apparatus
2 First antenna
3 Second antenna
4 Switch unit
5 Transmission unit
6 Reception unit
7 Storage unit
8 Communication level obtainment unit
9 Count unit
10 Determination unit
11 Antenna control unit
12 Antenna selection unit
101 Access point
111 Station A
110 Station B
113 Station C
114 Station D
210 Domestic network
220 Access point
230 Photovoltaics
240 Storage battery
250 Fuel cell
260 Air conditioner
270 TV

The invention claimed is:

1. A communication apparatus which communicates data with a plurality of other communication apparatuses by performing wireless communication, the communication apparatus comprising:
a plurality of antennas which transmit and receive a radio wave for the wireless communication;
a communication level obtainment unit configured to obtain communication levels obtained when the communication apparatus performed the wireless communication with the other communication apparatuses, the communication levels being obtained for a plurality of pairs each including one of the antennas and one of the other communication apparatuses;
a count unit configured to count, for each of the antennas, the number of established communications that is the number of one or more of the other communication apparatuses which successfully established communication through the antenna;
a determination unit configured to determine whether or not a total number of antennas whose numbers of established communications counted by the count unit are greatest is more than one;
an antenna selection unit configured to, when it is determined by the determination unit that the total number of antennas whose numbers of established communications are greatest is more than one, identify one of the other communication apparatuses corresponding to a lowest communication level among the communication levels of the pairs obtained by the communication level obtainment unit, and select, as an antenna for use in broadcasting, one of the antennas corresponding to communication levels higher than the lowest communication level among communication levels of the identified other communication apparatus through the antennas; and
a transmission unit configured to broadcast predetermined data to the other communication apparatuses through the antenna selected by the antenna selection unit.

2. The communication apparatus according to claim 1, wherein, when it is determined by the determination unit that the total number of antennas whose numbers of established communications are greatest is not more than one, the antenna selection unit is configured to select one of the antennas whose numbers of established communications are greatest.

3. The communication apparatus according to claim 1, wherein, when it is determined by the determination unit that the total number of antennas whose numbers of established communications are greatest is more than one, the antenna selection unit is configured to identify one of the other communication apparatuses corresponding to the lowest communication level among the communication levels of the pairs obtained by the communication level obtainment unit, and select one of the antennas whose communication levels are highest among communication levels of the identified other communication apparatus through the antennas.

4. The communication apparatus according to claim 1, further comprising
  a reception unit configured to receive data from the other communication apparatuses using any one of the antennas,
  wherein the transmission unit is configured to unicast data using any one of the antennas to each of the other communication apparatuses,
  the reception unit is configured to receive, using any one of the antennas, response information transmitted from, among the other communication apparatuses, an other communication apparatus which received the data unicasted by the transition unit, and
  the communication level obtainment unit is configured to obtain, as one of the communication levels, a reception level obtained when the response information is received by the reception unit.

5. The communication apparatus according to claim 4,
  wherein, while the reception unit is receiving the response information from one of the other communication apparatuses, the antenna selection unit is configured to switch the antenna for use in the reception, and
  the communication level obtainment unit is configured to obtain, as one of the communication levels, the reception level of each of the antennas used in the reception.

6. The communication apparatus according to claim 4,
  wherein the antenna selection unit is configured to:
  fix an antenna for use in the reception to any one of the antennas until reception level measurement between the antenna and all of the other communication apparatuses is completed in a time period during which the reception unit is receiving the response information from the other communication apparatuses; and
  when the reception level measurement between the antenna and all of the other communication apparatuses is completed, switch to another one of the antennas on which reception level measurement with the other communication apparatuses is not completed, and
  the communication level obtainment unit is configured to obtain, as one of the communication levels, the reception level of each of the antennas used in the reception.

7. The communication apparatus according to claim 1, further comprising
  a storage unit,
  wherein the communication level obtainment unit is configured to cause the storage unit to store the obtained communication levels as an antenna table in which the obtained communication levels are associated with the antennas and the other communication apparatuses, and
  the count unit is configured to count, as the number of established communications, the number of one or more of the other communication apparatuses for each of the antennas which have the communication levels stored in the antenna table.

8. The communication apparatus according to claim 7,
  wherein the communication level obtainment unit is further configured to update the antenna table stored in the storage unit every time the reception unit receives the response information, and
  the antenna selection unit is configured to select, among the antennas, the antenna for use in broadcasting using the updated antenna table.

9. The communication apparatus according to claim 1,
  wherein the count unit is further configured to count, for each of the antennas, the number of highest level terminals that is the number of one or more of the other communication apparatuses whose communication levels for the antenna are highest,
  the determination unit is further configured to determine whether or not a total number of antennas whose number of highest level terminals counted by the count unit is greatest is more than one, and
  when it is determined by the determination unit that the total number of antennas whose numbers of established communications counted by the count unit are greatest is more than one and that the total number of antennas whose numbers of highest level terminals are greatest is more than one, the antenna selection unit is configured to identify one of the other communication apparatuses corresponding to the lowest communication level among the communication levels of the pairs obtained by the communication level obtainment unit, and select, as the antenna for use in the broadcasting, one of the antennas corresponding to the communication levels higher than the lowest communication level among the communication levels of the identified other communication apparatus for each of the antennas.

10. The communication apparatus according to claim 9,
  wherein, when it is determined by the determination unit that the total number of antennas whose number of established communications is greatest is not more than one, the antenna selection unit is configured to select one of the antennas whose numbers of highest level terminals are greatest.

11. A communication method for use in a communication apparatus which communicates data with a plurality of other communication apparatuses by performing wireless communication and includes a plurality of antennas which transmit and receive a radio wave for the wireless communication,
  the communication method comprising:
  obtaining communication levels obtained when the communication apparatus performed the wireless communication with the other communication apparatuses, the communication levels being obtained for a plurality of pairs each including one of the antennas and one of the other communication apparatuses;
  counting, for each of the antennas, the number of established communications that is the number of one or more of the other communication apparatuses which successfully established communication through the antenna;
  determining whether or not a total number of antennas whose numbers of established communications counted in the counting are greatest is more than one;
  when it is determined in the determining that the total number of antennas whose numbers of established communications are greatest is more than one, identifying one of the other communication apparatuses corresponding to a lowest communication level among the communication levels of the pairs obtained in the obtaining, and selecting, as an antenna for use in broadcasting, one of the antennas corresponding to communication levels higher than the lowest communication level among the communication levels of the identified other communication apparatus through the antennas; and
  broadcasting predetermined data to the other communication apparatuses through the antenna selected in the selecting.

12. A non-transitory computer-readable recording medium storing a program for causing a computer to execute the method according to claim 11.

13. An integrated circuit of a communication apparatus which communicates data with a plurality of other communication apparatuses by transmitting and receiving a radio wave for wireless communication at a plurality of antennas, the integrated circuit causing the communication apparatus to:
- obtain communication levels obtained when the communication apparatus performed the wireless communication with the other communication apparatuses, the communication levels being obtained for a plurality of pairs each including one of the antennas and one of the other communication apparatuses;
- count, for each of the antennas, the number of established communications that is the number of one or more of the other communication apparatuses which successfully established communication through the antenna;
- determine whether or not a total number of antennas whose numbers of established communications counted are greatest is more than one;
- when it is determined that the total number of antennas whose numbers of established communications are greatest is more than one, identify one of the other communication apparatuses corresponding to a lowest communication level among the obtained communication levels of the pairs, and select, as an antenna for use in broadcasting, one of the antennas corresponding to communication levels higher than the lowest communication level among communication levels of the identified other communication apparatus through the antennas; and
- broadcast predetermined data to the other communication apparatuses through the selected antenna.

* * * * *